N. L. HATCH.
HAY LOADER.
No. 85,092.    Patented Dec. 22, 1868.
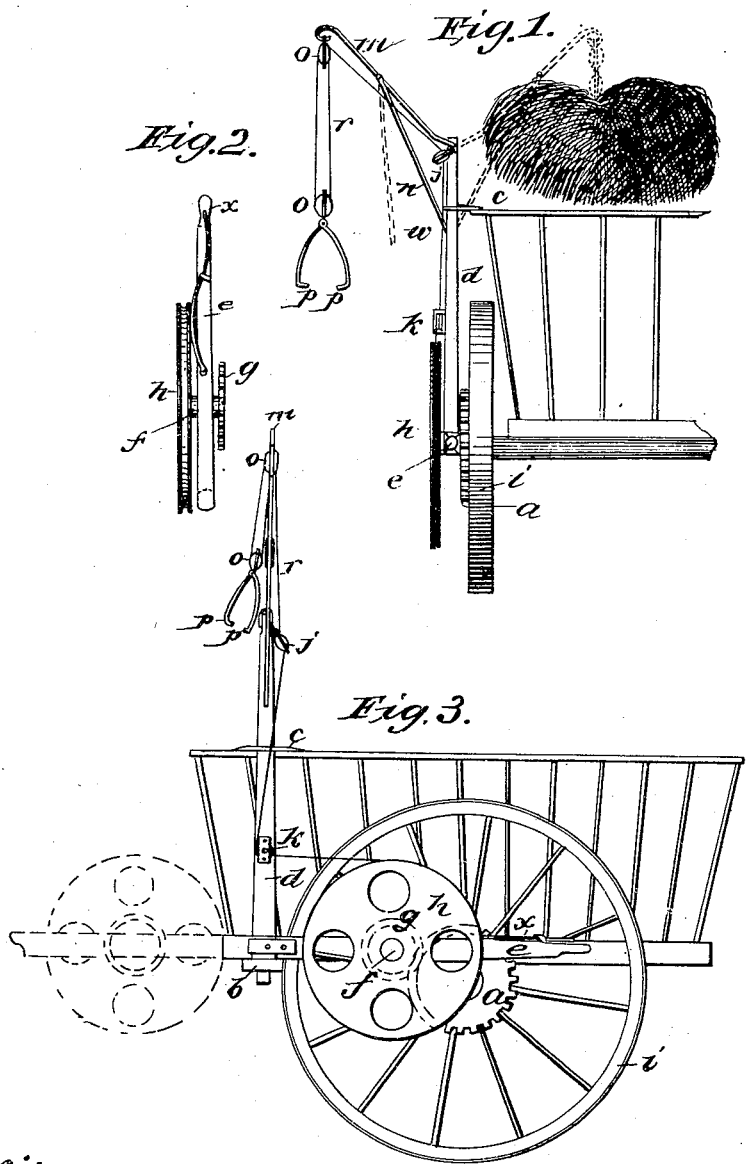

NEHEMIAH L. HATCH, OF CAPE ELIZABETH, MAINE.

Letters Patent No. 85,092, dated December 22, 1868.

IMPROVEMENT IN HAY-LOADERS

The Schedule referred to in these Letters Patent and making part of the same.

*To all whom it may concern:*

Be it known that I, NEHEMIAH L. HATCH, of Cape Elizabeth, in the county of Cumberland, and State of Maine, have invented a new and useful Hay-Loader; and I hereby declare the following to be a full, clear, and exact description thereof, which will enable others to make and use my invention, reference being had to the accompanying drawings, forming part of this specification, in which—

Figure 1, plate 1, shows an end view of a portion of a cart, with my invention thereon, in operation.

Figure 2 is a detail of the wheel and gear, so taken as to shown the lever or arm.

Plate 2 shows a side view of a cart with my device attached thereto.

The purpose of my invention is to produce a cheap and simple contrivance to load hay from the field into the rack or cart, by the motion of the cart and the power of the cattle.

With this view I first attach to the hub of one of the cart-wheels a small gear, $a$, to revolve with the hub, as the cart is drawn along.

From the bottom of the cart-body I run out an arm, $b$, with a hole in its end.

At the top of the cart-frame I attach a piece, $c$, also with a hole therein.

Into the holes in the two pieces $b$ and $c$, I set the upright, $d$. This upright has a shoulder, so as to keep it in place in $b$, (see plate 2,) and is loosely held in $c$.

To the base of this upright, $d$, is rigidly attached the horizontal arm $e$. Through this horizontal arm $e$ is set an axle, $f$, having on the inside, rigidly attached to it, the gear $g$, and on the outside, the larger wheel $h$.

The purpose of this is, that, by the lever $e$, the wheel $h$ and gear $g$ can be swung away from the cart-wheel, as seen in dotted lines in plate 2.

When placed so that the gear $g$ will match the gear $a$, as in the drawing, then the revolution of the cart-wheel $i$ will turn $g$ and $h$.

The upright, $d$, has attached to it two blocks, one at the top, $j$, and one on a line with the top of the wheel $h$ at $k$. It also has hinged to it, at the top, the arm $m$, with its brace $n$, to hold $m$ as desired, and catching into a recess cut into $d$.

The purpose of having $n$ hinged or jointed to $m$, and so as to be capable of being slipped out of the upright, $d$, is in order that $m$ and $n$ can be dropped or turned down by the side of $d$, when not in use, so that the device will not be too high to enter the door of a barn.

At the upper end of $m$ are attached two blocks, as shown at $o$ $o$, and carrying two hooks. Through the blocks $o$ $o$, $j$, and $k$, runs the cord $r$, which is attached to the circumference of the wheel $h$, which is grooved on the edge to receive the cord.

Now, when the gear $g$ is matched with the gear $a$, by means of the arm $e$ being placed as seen in plate 2, it is evident that the revolution of the cart-wheel $i$ will revolve the wheel $h$, and so wind up the cord $r$, and thus raise the hooks $p$ $p$, and that at any moment the winding up can be arrested by throwing off the arm $e$, and consequently the gear $g$ out of $a$.

The turning of the upright, $d$, by the arm $e$, has another purpose. When $g$ matches $a$, then it is seen, from plate 1, that the arm $m$ hangs out beyond the cart or rack, but by swinging $e$ around on the pivot of $d$ at $b$, (seen in plate 2,) then $m$ is thrown in over the cart or rack, and the contents of the hooks $p$ $p$ ready to be dropped into the cart.

This is illustrated in plate 1, and is effected by turning $d$ around on its base at $b$, by the means of the arm or hand-lever $e$.

The hooks $p$ $p$ are designed to be dropped down to the ground, and their horizontal parts pushed under a heap of hay, and when lifted over the cart, as in plate 1, the person standing in the cart pulls out one, or pulls them apart, and the hay drops into the cart.

After the hooks $p$ $p$ have deposited the heap of hay in the cart, they are drawn down to the necessary point to pass under another heap of hay, and the gear $g$ then swung round to match $a$, and is then ready to lift the next heap. Throw out the brace $n$ at its connection with $d$ at $w$, and then $m$ and $n$, with cord $r$, and the pulleys, will drop down alongside of $d$, and thus be but little in the way. The upright, $d$, can then be lifted out of the hole in $b$, and, together with arm $e$, wheel $h$, and gear $g$, be placed in the cart, and carried or laid away.

My device is attachable to and detachable from a common cart.

I do not, of course, claim the component parts; they are not new.

When the hooks $p$ $p$ are drawn up with a load, as in plate 1, the load is held from running down, by the arm $x$, pressed by hand against the wheel $h$, and thus stopping its revolution.

What I claim as my invention, and desire to secure by Letters Patent, is—

The combination of the gear $a$, on the wheel-hub, gear $g$, on the arm $e$, arm $e$, wheel $h$, cord $r$, blocks $k$ and $j$, arms $m$ $n$, and blocks $o$ $o$, as and for the purposes set forth.

NEHEMIAH L. HATCH.

Witnesses:
WILLIAM HENRY CLIFFORD,
HENRY C. HOUSTON.